PHASE-FREQUENCY CONTROL SYSTEM FOR CARRIER-MULTIPLEX RECEIVER

Filed July 21, 1958 2 Sheets-Sheet 1

INVENTOR.
SAMUEL H. COLODNY
BY
Robert D. Sanborn
ATTORNEY

INVENTOR.
SAMUEL H. COLODNY
BY
Robert D. Sanborn
ATTORNEY

United States Patent Office 3,031,529

Patented Apr. 24, 1962

3,031,529

PHASE-FREQUENCY CONTROL SYSTEM FOR CARRIER-MULTIPLEX RECEIVER

Samuel H. Colodny, Levittown, Pa., assignor, by mesne assignments, to Philco Corporation, Philadelphia, Pa., a corporation of Delaware Filed July 21, 1958, Ser. No. 749,995
12 Claims. (Cl. 179—15)

The present invention relates to radio receiver systems and more particularly to single channel multiplex receivers for binaural or stereophonic program signals.

It is known that the reproduction at a distance of orchestral performances, operas, stage plays and many other programs is more realistic and enjoyable if the reproducing system provides binaural or stereophonic sound rather than monaural sound from a single speaker system. As is well known, the binaural or stereophonic reproduction of a performance requires that the sound be detected at two spaced points and played back through correspondingly spaced reproducers. A distinction is sometimes made between stereophonic and binaural reproduction based on the type and spacing of the audio reproducers employed at the receiving end. Since the present receiver is adaptable for use with either system the terms "binaural reproduction" and "stereophonic reproduction" will be treated as synonymous in this specification. Preferably the signal representing the sound detected at each of the spaced points is supplied only to the corresponding reproducer at the distant location. This essentially requires a separate information channel from each microphone at the program site to the corresponding reproducer at each receiving site. The frequency restrictions imposed on radio broadcasting stations do not permit dual channel operation of the radio station to carry the two signals necessary for stereophonic broadcasting. Therefore at the present time stereophonic broadcasts are limited to locations in which two radio stations are under common ownership or control. The usual practice at the present time is to send one channel of a stereophonic broadcast by way of an amplitude modulated radio station and to send a second channel of the stereophonic broadcast by way of an associated frequency modulated radio station. This system requires a large investment in equipment at the transmitting end and two complete radio receivers at the receiving end.

Systems have been proposed in the past for sending the two stereophonic signals over a single amplitude modulated radio channel with a resultant saving of equipment both at the transmitting station and at each receiving location. In accordance with the teachings of the prior art, the two stereophonic program signals may be sent over a single radio frequency channel and then separated into their respective audio channels at the receiver by modulating the two program signals on quadrature phased carriers which are linearly combined before being transmitted. That is, a signal at the carrier frequency assigned to the station is modulated with one of the two stereophonic program signals while at the same time a signal of the same carrier frequency but of quadrature phase is modulated with the second of the two stereophonic program signals. The two modulated carrier signals are then linearly combined to prevent intermodulation. The combined signal is then broadcast over the channel assigned to that station. At the receiver the two stereophonic program signals are separated by supplying the received signals to two synchronous detector circuits. One synchronous detector is supplied with a reference signal of one phase and frequency and the other synchronous detector circuit is supplied with a reference signal of the same frequency but in quadrature phase with the first reference signal.

The system just described requires only one high power transmitter at the sending location and only one radio receiver at each receiving location. Therefore this system represents a considerable saving in equipment both at the broadcasting location and at each receiving location over dual station systems now in operation. A single channel multiplex stereophonic system also utilizes only one channel per program instead of the two channels now required for each stereophonic broadcast.

The single channel multiplex system just described shares the advantage with the dual station system of stereophonic broadcasting that the stereophonic broadcast can be received on a conventional amplitude modulated receiver as a monaural signal. It can be shown that the geographic range of monaural reception of a stereophonic broadcast is substantially the same as the range of reception of a monaural broadcast of the same total power. Also, the geographic range of stereophonic reception is substantially the same as a range of monaural reception owing to the greater efficiency of synchronous detectors over the envelope detectors normally employed in commercial amplitude modulated broadcast receivers.

Despite the many obvious advantages of the single channel multiplex system of stereophonic broadcasting it has not been received with favor by radio broadcasters for the reason that, in the past, it has been difficult and expensive to construct radio receivers which could generate the demodulating reference signals with the necessary precision in phase and frequency. The reference signals must have a phase and frequency which is directly related to the phase and frequency of the individual carrier signals employed at the transmitter. Typical binaural multiplex receiving systems of the prior art employ extremely narrow band filters for separating the received carrier from the sidebands. The separated carrier is employed as the reference signal or is used to synchronize a reference signal generator. Since very narrow band filters are required in such systems it is difficult if not impossible to tune the receiver from one broadcast channel to another. Therefore binaural receivers of the prior art are generally single channel, fixed-tuned receivers. Other means for generating or synchronizing the required reference signals have been proposed but they are generally more complex than the narrow band filter systems mentioned above and they are equally difficult to adapt to tunable radio receivers.

Therefore it is an object of the present invention to provide an improved receiver for single channel multiplex reception of two stereophonic program signals.

It is a further object of this invention to provide an improved receiver for single channel multiplex signals which can be readily tuned to different stations.

Still another object of the present invention is to provide a receiver of single channel multiplex stereophonic signals which does not require narrow band filters for carrier separation.

In general these objects of the invention are achieved by employing two synchronous detector circuits each energized by the same received signal and by quadrature phased reference signals. The direct current components present at the outputs of the two demodulators are combined to form a frequency control signal. This frequency control signal is supplied to the reference signal generator to control the phase and frequency thereof. In tunable superheterodyne receivers the control signal may be supplied to either the reference signal generator which supplies the synchronous detectors or to the local oscillator which supplies a signal to the first heterodyned detector. In one preferred embodiment of the invention additional means, controlled by the received signal, may be provided for setting the initial frequency of the control oscillator to approximately the proper value for synchronous detection of the received signal.

For a better understanding of the present invention together with other and further objects thereof reference should now be made to the following detailed description which is to be read in conjunction with the accompanying drawings in which.

Figures 1, 2, 3, 4:
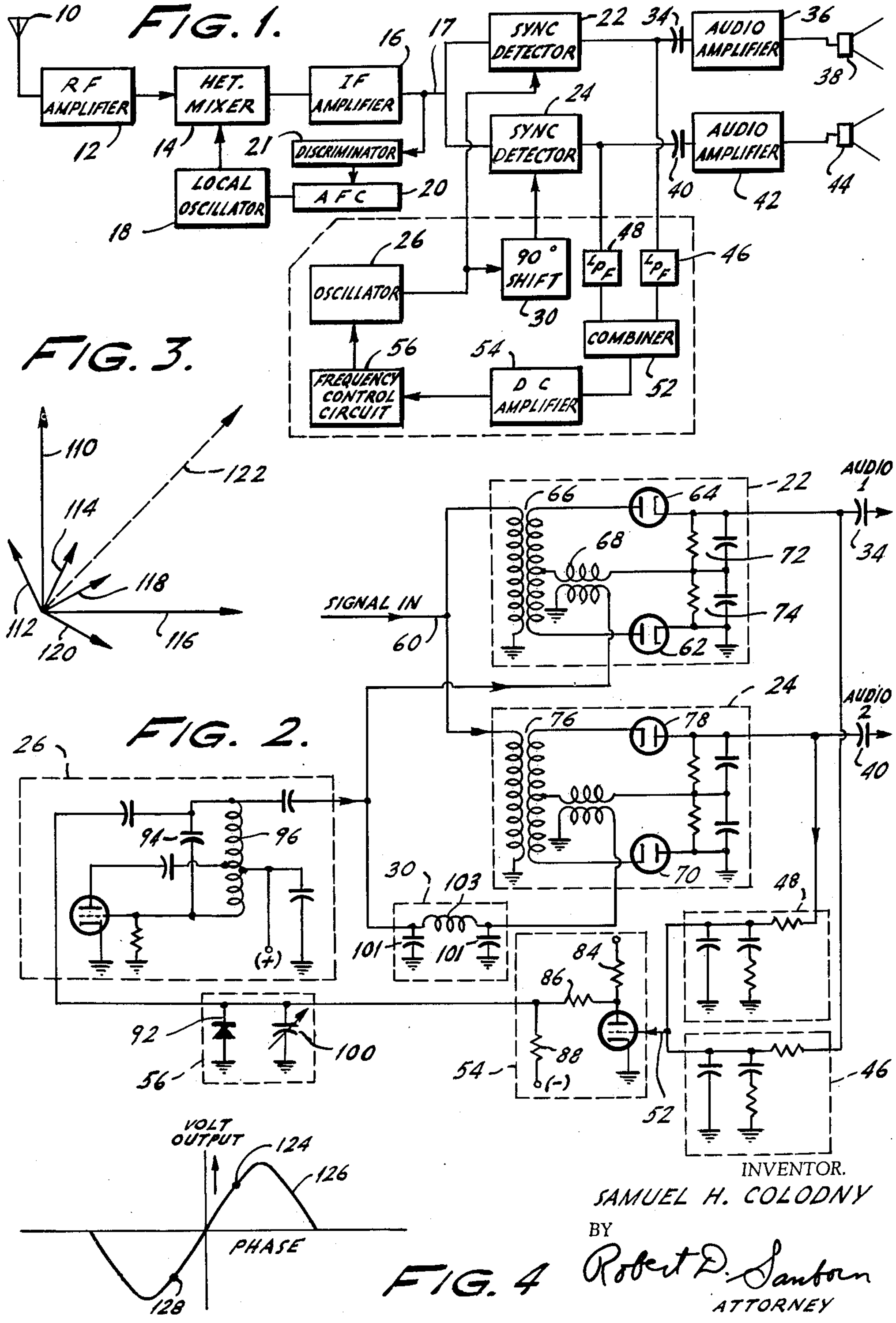
FIG. 1 is a block diagram of a preferred embodiment of the invention.
FIG. 2 is a schematic drawing of a portion of the circuit of FIG. 1.
FIG. 3 is a vector diagram which represents the signal components of a single channel multiplex stereophonic signal.
FIG. 4 is a plot of the control characteristic of the phase-frequency control portion of FIG. 2.

The embodiment of the invention shown in FIG. 1 is a superheterodyne receiver which may be conventional from the antenna through the intermediate frequency amplifier. The receiver shown in FIG. 1 comprises a receiving antenna 10 which connects to the input of the tuned radio frequency stages 12. The radio frequency stages 12 are followed by heterodyne mixer 14 and intermediate frequency amplifier 16. In accordance with conventional practice heterodyne mixer 14 is supplied with a local oscillator signal from local oscillator 18. An automatic frequency control 20 is connected to local oscillator 18 to prevent the frequency of oscillator 18 from drifting. A reference signal for automatic frequency control circuit 20 may be supplied by a discriminator 21 which receives an input signal from the output of intermediate frequency amplifier 16. As will be explained in more detail presently it is preferable but not absolutely necessary that local oscillator 18 maintain a fixed frequency. However the time rate of change of frequency of oscillator 18 should be held to a low value.

Except for the automatic frequency control 20 which is not now normally employed in superheterodyne receivers, the circuit thus far described is conventional in form. The radio frequency amplifiers 12 may be omitted in accordance with commercial practice if the added sensitivity and selectivity provided by these stages are not required.

The output signal of intermediate frequency amplifier 16 is supplied to the inputs of two synchronous detectors 22 and 24. Synchronous detectors 22 and 24 are supplied with a reference signal by oscillator 26. The signal from oscillator 26 is supplied directly to synchronous detector 22. However the reference signal to synchronous detector 24 is supplied by way of a 90° phase shifter 30. The frequency of oscillator 26 is made equal to the intermediate frequency carrier component of the received signal so that the signal at the output of detectors 22 and 24 is the demodulated audio signal. As will be explained in more detail presently, if oscillator 26 has the proper frequency and phase, the output signal from synchronous detector 22 represents one of the two stereophonic program signals present on the received carrier and the output signal from synchronous detector 24 represents the second of the two stereophonic program signals present on the received carrier.

The output circuit of synchronous detector 22 is connected through a D.C. blocking capacitor 34 to an audio frequency amplifier 36. A speaker 38 is provided for converting the electrical signal supplied by audio amplifier 36 into sound waves for audio reception. Similarly, the output circuit of synchronous detector 24 is connected through a capacitor 40 to an amplifier 42 and speaker 44.

The output circuits of synchronous detectors 22 and 24 are connected also through low pass filters 46 and 48, respectively, to a combining circuit 52. The time constants of filter circuits 46 and 48 are selected to be long compared to a period of the lowest audio component so that all audio frequency program components present in the output of synchronous detectors 22 and 24 are excluded from combiner 52. Obviously any frequencies above the audio range will also be excluded. It will be shown presently that when oscillator 26 has the proper frequency and phase for the desired multiplex operation of the system, the D.C. components at the output of synchronous detectors 22 and 24 will be equal in amplitude. These D.C. components may be of the same or different polarity depending upon the type of synchronous detectors employed. Combiner 52 is a circut which combines the two D.C. signals at the output of low pass filters 46 and 48 to produce a resultant D.C. signal of zero amplitude when oscillator 26 is at the proper frequency and phase. If the D.C. signals at the output of filters 46 and 48 are of opposite polarity, combiner 52 may be a simple resistive adder network. If the D.C. signals at the output of filters 46 and 48 are of the same polarity, combiner 52 may be a suitable subtraction circuit.

Combiner circuit 52 is connected through a D.C. amplifier 54 to a frequency control circuit 56. The purpose of amplifier 54 is to increase the sensitivity of the phase-frequency control loop being described. If the added sensitivity is not required then amplifier 54 may be omitted. Frequency control circuit 56 is connected to oscillator 26 in a manner to control the phase and frequency of the signal generated by oscillator 26.

The synchronous detectors 22 and 24, the oscillator 26 and the phase-frequency control loop for the oscillator 26 are shown in more detail in FIG. 2. The broken line rectangles in FIG. 2 correspond to the blocks shown in FIG. 1 and therefore have been given corresponding reference numerals. As shown in FIG. 2, synchronous detector 22 is of conventional form. The input signal appearing on lead 60 is supplied to the anodes of two diodes 62 and 64 in push-pull by way of transformer 66. The signal from oscillator 26 is supplied in phase to the anodes of the two diodes by way of transformer 68. Cathode load circuits 72 and 74 are connected in series between the cathodes of diodes 62 and 64. The stereophonic program signal for one channel appears across the serially connected load circuits 72 and 74 and is supplied to capacitor 34 in the manner mentioned in connection with the description of FIG. 1.

The synchronous detector 24 shown in FIG. 2 is similar to detector 22. The only difference between detectors 22 and 24 is that the diodes 78 and 70 are reversed in detector 24. This reversal of the diodes changes the polarity of the D.C. component of the output signal of detector 24. This is desirable since it simplifies the combiner circuit 52. Reversal of diodes 78 and 70 also reverses the phase of the audio modulation components. However this reversal in phase can be compensated for by including an inverter stage in one of the audio amplifiers 36 or 42 or by reversing the connections to one of the speakers 38 or 44.

Low pass filters 46 and 48 in the circuit of FIG. 2 comprise simple resistance capacitance filter circuits. Since the construction of synchronous detectors 22 and 24 has been chosen to cause the D.C. component of the output signal from the two detectors to be of opposite polarity, the combining circuit 52 of FIG. 1 may be simply a common connection to the output of filters 46 and 48. Adequate audio frequency isolation between the outputs of the two synchronous detectors is afforded by the series resistance elements in the filters 46 and 48.

The D.C. amplifier 54 of FIG. 2 comprises a single stage direct-coupled D.C. amplifier. The load resistor 84 and the output coupling resistors 86 and 88 form a potential divider between the positive source represented by the plus sign (+) and the negative source of supply represented by the minus symbol (−). The values of these resistors may be chosen to give the proper D.C. bias potential on the output lead from amplifier 54 for the frequency control circuit 56. The frequency control circuit 56 of FIG. 2 comprises a variable capacity, back-biased diode 92. Alternatively, a reactance tube may be employed instead of diode 92. Diode 92 is connected in circuit with the capacitor 94 in the oscillator circuit 26. Capacitor 94 together with inductor 96 form the frequency controlling tank circuit of the oscillator. A variable capacitor 100 may be provided in frequency control circuit 56 for manually adjusting the desired frequency of oscillator 26 to approximately the mid-point of the control range of circuit 56.

As shown in FIG. 2, the output of oscillator 26 is connected directly to the primary of transformer 68 in synchronous detector 22. The phase shifter 30 of FIG. 2 which connects oscillator 26 to synchronous detector 24 comprises shunt capacitances 101 and a series inductance 103. Any other suitable form of phase shifter may be employed if desired.

The use of synchronous detectors to separate the modulation signals present on quadrature phase carriers is well known and therefore will be described only briefly.

Turning to FIG. 3, vector 110 represents the carrier frequency for one of the stereophonic program channels. Vectors 112 and 114 represent the audio sideband components of this stereophonic program channel. Vector 116 represents the carrier frequency for the second stereophonic program channel. Vectors 118 and 120 are the sideband components of the second stereophonic program channel. The sideband components represented by vectors 118 and 120 will be similar to the components represented by vectors 112 and 114 but usually they will not be identical owing to the fact that they are picked up by different microphones at different locations with respect to the source. The carrier signals represented by vectors 110 and 116 are of the same frequency and therefore will appear as a resultant carrier frequency 122.

The signal appearing at antenna 10 of FIG. 1 may be represented by vectors 112, 114, 118, 120 and the resultant carrier vector 122. The vector diagram of FIG. 3 may also be employed to represent the signal at the output of IF amplifier 16. Passing the signal received at antenna 10 through heterodyne detector 14 merely changes the frequencies of the signals represented by vectors 112, 114, 118, 120 and 122. It will also cause these vectors to have absolute phases determined by the phase of the local oscillation signal supplied by oscillator 18. However the relative phase and frequency relationships between the carrier vector 122 and the sideband vectors 112, 114, 118 and 120 will not change.

The operation of synchronous detectors 22 and 24 depends upon the insertion into detector 22 of a reference signal from oscillator 26 which is in phase with the intermediate frequency counterpart of the original carrier vector 110. In accordance with well known heterodyne detection theory the sideband components 112 and 114 will combine with a reference signal which is in phase with vector 110 to produce the desired audio frequency components. The combination of the sideband component represented by vector 118 with a reference component represented by vector 110 will produce an audio component which has an amplitude equal to the amplitude of the audio component produced by the combination of the sideband 120 with the signal represented by vector 110. However the phase of the component represented by vector 118 will be 180° opposed to that represented by vector 120. Therefore the sideband components of the original vector 116 will produce no net output when combined with a reference signal which is in phase with vector 110. Similarly a reference signal which is in phase with the carrier signal represented by vector 116 will provide an output signal derived from sidebands 118 and 120 but no output signal derived from sidebands represented by vectors 112 and 114. The two synchronous detectors 22 and 24 therefore separate the modulation components which were present in one radio frequency channel into two separate audio frequency channels where they may be utilized by amplifiers 36, 42 and speakers 38 and 44 to reproduce the desired stereophonic sound.

The direct current component of the signal at the output of each of the detectors 22 and 24, respectively, has an amplitude which is a function of the angle between the reference voltage supplied to that detector and the resultant carrier signal which is represented by vector 122. This D.C. component will vary from a maximum if the reference voltage is in phase with vector 122 to zero if the reference signal is 90° out of phase with vector 122. If the frequency and phase of oscillator 26 is such that the signal supplied by oscillator 26 is in phase with the signal represented by the original carrier vector 110 and so that the signal supplied by phase shifter 30 is in phase with the original carrier vector 116, the average D.C. signal at the output of detectors 22 and 24 will be equal in amplitude. As a result the output voltage of combiner circuit 52 will be zero if oscillator 26 is at the proper frequency and phase. If the phase of oscillator 26 changes so that it no longer corresponds to that of vector 110, the average D.C. components of the output signal from detectors 22 and 24 will no longer be equal.

FIG. 4 is a plot of phase vs. voltage output for the combiner circuit 52. As shown by curve 126 in FIG. 4, if the phase of the signal from oscillator 26 changes in one direction the positive output signal supplied by one of the detectors will be greater than the negative signal supplied by the other detector so that a positive signal will appear at the output of combiner circuit 52. One possible operating point is represented by the point 124 on curve 126. If the phase of the signal from oscillator 26 changes in the opposite direction a negative signal will appear at the output of combiner circuit 52 as represented by the point 128 on curve 126.

The phase of the signal at the output of oscillator 26 is controlled by controlling the net capacitance in the tank circuit of this oscillator. That is, the positive or negative signal supplied by combiner circuit 52 will produce a corresponding variation in the potential appearing at the junction of resistors 86 and 88 of D.C. amplifier 54. This signal from amplifier 54 is supplied to the back bias diode 92 in frequency control circuit 56 to change the capacitance of diode 92 in a direction to restore the desired phase relationship. It may be helpful in understanding the operation of this circuit to assume that if the signal from oscillator 26 is lagging behind its proper phase, the frequency of oscillator 26 will be momentarily increased due to the change in tank circuit capacitance until the desired phase condition has been restored.

As mentioned earlier, the intermediate frequency signal which is supplied to detectors 22 and 24 has a phase which is determined by the phase of the signal supplied by the local oscillator 18. Therefore the phase of oscillator 26 is locked to the phase of the IF carrier component. If the local oscillator 18 drifts in frequency or phase, frequency control circuit 56 will control the frequency and phase of oscillator 26 to again reestablish the desired phase relationship. It is obvious that automatic frequency control 20 need only maintain the frequency of local oscillator 18 within the control range of circuit 56.

Figure 5:
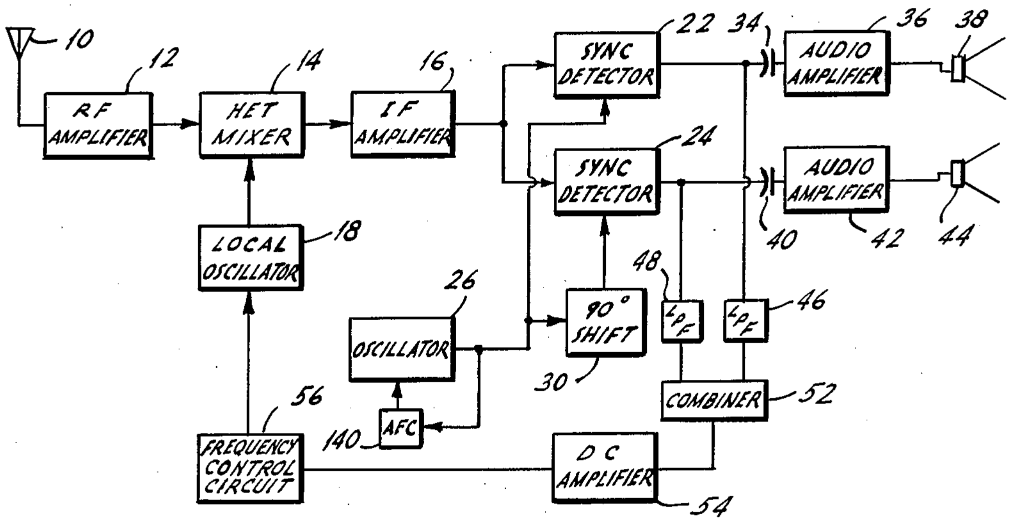
FIG. 5 is a block diagram of a second preferred embodiment of the invention in which frequency of the local oscillator is controlled by the output of the synchronous detectors.

The circuit of FIG. 5 is very similar to the circuit of FIG. 1. Corresponding parts have been given corresponding reference numerals. In the circuit of FIG. 5 the output of the frequency control circuit 56 is connected to local oscillator 18 rather than to the reference oscillator 26. Oscillator 26 has been provided with a frequency control circuit 140 for maintaining the frequency and phase of oscillator 26 relatively constant. Circuit 140 may be, for example, a crystal control circuit or a suitable form of frequency controlling feedback circuit. As mentioned earlier oscillator 26 must have a frequency equal to the carrier frequency component of the IF signal and must have a phase corresponding to the heterodyne phase of the original carrier which is represented by vector 110 in FIG. 3. The phase of the heterodyne carrier depends upon the phase of the signal supplied by local oscillator 18. Therefore it will be seen that the desired phase and frequency relationship between the signal supplied by local oscillator 18 and signal supplied by oscillator 26 may be obtained by controlling frequency and phase of local oscillator 18 while maintaining oscillator 26 at a fixed frequency. Since the freqeuncy of the local oscillator signal is subtracted from the frequency of the incoming signal to provide the intermediate frequency signal it may be necessary to provide an additional inverter stage in the phase-frequency loop or otherwise alter the sense of the control signals in this loop so that the frequency of the oscillator is corrected in the proper direction by the signal supplied by combiner circuit 32. Since oscillator 26 normally remains relatively fixed in frequency regardless of the station to which the receiver is tuned while the frequency of operation of oscillator 18 is changed appreciably in tuning from one station to the next it is usually more economical from an engineering standpoint to apply frequency stabilization to the fixed oscillator 26 and to apply the variable frequency control derived from combiner 52 to the variable frequency oscillator 18. Therefore while the embodiments of FIGS. 1 and 5 may be equivalent in terms of performance the embodiment of FIG. 5 may be preferred as a commercial receiver because of the possible economy just mentioned.

Only superheterodyne receivers have been shown in FIGS. 1 and 5. However it should be understood that, in the circuit of FIG. 1, heterodyne detector 14, IF amplifier 16, local oscillator 18 and the associated frequency control 20 may be omitted entirely. In this case two radio frequency stages 12 would comprise the station selector. Oscillator 26 would have a frequency and phase corresponding to the frequency and phase of one quadrature component of the resultant carrier received by antenna 10. If the circuit provides no fixed intermediate frequency signal some provision must be made for varying the frequency of oscillator 26 if the circuit is to be tuned to different stations.

FIG. 6 is again similar to a portion of the circuit shown in FIG. 1. Corresponding parts in the two figures have been given corresponding reference numerals. As will be seen detectors 22 and 24 of FIG. 6 correspond to detectors 22 and 24 of FIG. 1. The normal phase-frequency control circuit for oscillator 26 which includes low pass filters 46 and 48, combiner circuit 52, D.C. amplifier 54 and frequency control circuit 56 are all the same as in the circuit shown in FIG. 1. However, FIG. 6 includes a second frequency-control circuit for oscillator 26. The second frequency control circuit includes a discriminator 150 which has a center frequency which is equal to the undeviated frequency of oscillator 26. The output of discriminator 150 is applied to the input of D.C. amplifier 54. A normally open gate circuit 152 is connected between the input lead 60 to synchronous detectors 22 and 24 and the input of discriminator 150. A low pass filter 154 is connected between the output of one of the synchronous detectors, in this case detector 24, and the control input of gate 152. Gate 152 is so constructed that when the signal supplied by low pass filter 154 reaches a certain amplitude level the gate 152 is disabled and the signal path from input lead 60 to discriminator 150 is interrupted.

Figure 6:
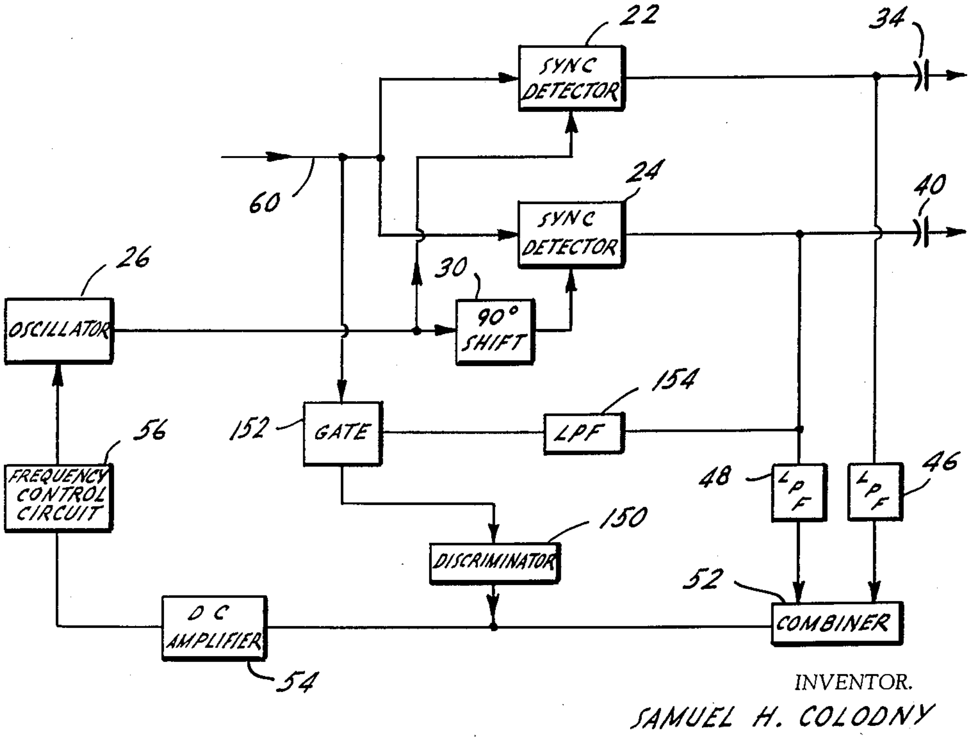
FIG. 6 is a block diagram of a preferred embodiment of the invention in which the initial frequency of the reference oscillator is controlled by the received signal supplied to the inputs of the synchronous detectors.

The function of the second frequency control circuit in FIG. 6 is to bring the frequency of oscillator 26 initially to approximately the proper value for synchronous demodulation of the received signal so that the phase-frequency control loop including low pass filters 46 and 48 and the associated circuitry may take control. The inclusion of discriminator 150 is made necessary by the fact that the "hold-in" range of the phase-frequency control loop including low pass filters 46 and 48 is much greater than the "pull-in" range for this circuit.

The circuit shown in FIG. 6 operates in the following manner. The resultant carrier signal represented by the vector 122 in FIG. 3 is supplied through gate 152 to the discriminator 150. If the frequency of the incoming signal is above the crossover frequency of discriminator 150, this discriminator 150 will supply a signal to D.C. amplifier 54 of the proper polarity to increase the frequency of oscillator 26. If the frequency of the incoming signal is below the crossover frequency of discriminator 150, discriminator 150 will supply a signal to circuits 54 and 56 which will reduce the frequency of oscillator 26. If the signal supplied by oscillator 26 is not of the proper frequency, the amplitude of the D.C. output signal supplied by detectors 22 and 24 will be substantially zero. Therefore no signal will be supplied by way of low pass filter 154 to the input of gate circuit 152. However as oscillator 26 approaches the proper frequency and phase the D.C. component of the signal at the output of detectors 22 and 24 will increase to the point where the normal phase-frequency control circuit including filters 46 and 48 can take control. At this point the increased signal supplied by low pass filter 154 to gate 152 disables this gate and removes the input signal from discriminator 150. The auxiliary frequency control circuit including discriminator 150 will come into operation as the radio receiver is tuned from one station to another or when the receiver is initially turned on but will not be in operation once the receiver has locked on the desired frequency.

If it is desirable to provide two identical synchronous detector-audio channels while at the same time providing D.C. output signals of different polarities at the output filters 46 and 48, the phase of one of the carrier components 110 or 116 may be reversed with respect to the associated sidebands at the transmitter. This has the disadvantage that the resultant signal is incompatible with conventional envelope detectors.

The filters, synchronous detectors, amplifiers and the like shown in FIG. 2 are shown by way of example only and known equivalents may be substituted therefor without departing from the scope of the present invention.

While the invention has been described with reference to the preferred embodiments thereof, it will be apparent that various modifications and other embodiments thereof will occur to those skilled in the art within the scope of the invention. Accordingly I desire the scope of my invention to be limited only by the appended claims.

What is claimed is:

1. In a superheterodyne receiver for amplitude-modulated, quadrature-phased carrier multiplex signals, said receiver including a heterodyne mixer responsive to said multiplex signals, a local oscillation generator for supplying a heterodyning signal to said mixer, first and second synchronous detectors, means connecting the output of said heterodyne mixer to a first input of each of said synchronous detectors, a reference signal generator, and means for supplying the output signal of said reference signal generator to second inputs of said first and second synchronous detectors, the relative phase angle at said first detector between the signals supplied by said reference oscillator and one of the quadrature-phased carrier signal components differing by 90 electrical degrees from the relative phase angle at said second detector between the signal supplied by said reference oscillator and the same one of said carrier phase signal components, means for maintaining a preselected phase-frequency relationship between the output signal of said reference signal generator and the heterodyne signal at the output of said mixer, said last-mentioned means comprising means connected to the output circuits of said first and second synchronous detectors, respectively, and providing a signal derived from the direct current components of the output signals of said first and second detectors and representative of the difference in the magnitudes of the direct current components of the output signals of said first and second detectors, respectively, means connected to said last-mentioned means and to one of said two generators for controlling the phase and frequency of the signal supplied thereby in accordance with the magnitude and polarity of said signal representative of said difference and in a direction to minimize said difference.

2. In a superheterodyne receiver for amplitude-modulated, carrier-multiplex, stereophonic program signals, said receiver including a heterodyne mixer, a local oscillation generator associated with said heterodyne mixer, first and second synchronous detectors receiving signals derived from the output signal of said heterodyne mixer and a reference signal generator for supplying the demodulating reference signals to said two synchronous detectors, the phase and frequency required of the signal from each of said generators being dependent upon the phase and frequency of the signal supplied by the other of said generators, signal responsive phase and frequency control means associated with one of said generators, means for supplying to first and second inputs of said phase and frequency control means signals derived from the direct current components present at the outputs of said first and second detectors and representative of the magnitudes of the direct current components present at the outputs of said first and second detectors, respectively, said frequency control means being arranged to alter the phase and frequency of the signal supplied by the generator with which it is associated in a direction to equalize the magnitudes of said direct current components at the output of said two detectors.

3. A radio receiver system for separating information signals multiplexed on two differently phased carrier signals of the same frequency into separate information channels, said receiver system including first and second synchronous detectors, means for supplying said multiplex signal to one input of each of said synchronous detectors, a reference signal oscillator, means for supplying the output signal of said oscillator to said first synchronous detector in a first phase and to said second synchronous detector in a second phase, the difference between said first and second phases being equal to the phase difference between said differently phased carrier signals, means for maintaining a predetermined phase relationship between the output signal of said reference oscillator and one of the multiplex carrier signals supplied to said two synchronous detectors, said last-mentioned means comprising first and second low pass filters connected to the outputs of said first and second synchronous detectors, respectively, signal combining means connected to the outputs of said low pass filters, said signal combining means providing an output signal having an amplitude and polarity which is indicative of the relative magnitudes of the signals passed by said low pass filters, signal responsive variable reactance means connected to the output of said combining means, said variable reactance means being connected in circuit with said reference oscillator thereby to control the phase and frequency of the signal generated thereby.

4. A radio receiver system for separating information signals multiplexed on two differently phased carrier signals of the same frequency into separate information channels, said receiver system including a heterodyne mixer circuit, a local oscillation generator associated with said heterodyne mixer circuit, means for supplying said multiplex signal to said heterodyne mixer circuit, first and second synchronous detectors, means for supplying the output signal of said heterodyne mixer to one input of each of said synchronous detectors, a reference signal generator, means for supplying the output signal of said reference signal generator to said first synchronous detector in a first phase and to said second synchronous detector in a second phase, the difference between said first and second phases being equal to the phase difference between said differently phased carrier signals, and means for maintaining a predetermined phase relationship between the output signal of said reference oscillator and one of the multiplex carrier signals supplied at the input of said two synchronous detectors, said last-mentioned means comprising first and second low pass filters connected to the outputs of said first and second synchronous detectors, respectively, signal combining means connected to the outputs of said low pass filters, said signal combining means providing an output signal having an amplitude and polarity which is indicative of the relative magnitudes of the signals passed by said low pass filters, signal responsive variable reactance means connected to the output of said combining means, said variable reactance means being connected in circuit with one of said generators thereby to control the phase and frequency of the signal generated thereby.

5. A radio receiver as in claim 4 wherein said variable reactance means is associated with said local oscillation generator, said radio receiver further comprising frequency control means associated with said reference signal generator for maintaining the signal generated thereby at a preselected frequency.

6. A radio receiver system as in claim 4 wherein said variable reactance means is associated with said reference signal generator, said radio receiver further comprising automatic frequency control means associated with said local oscillation generator for maintaining the carrier frequency component of the signal at the output of said heterodyne mixer at a preset frequency.

7. A radio receiver system for separating information signals multiplexed on two differently phased carrier signals of the same frequency into separate information channels, said receiver system including first and second synchronous detectors, coupling means for supplying said multiplex signal to one input of each of said synchronous detectors, a reference signal oscillator, coupling means for supplying the output signal of said oscillator to said first and second synchronous detectors, at least one of said two last-mentioned coupling means including phase shift means, the phase shift provided by said phase shift means being such that the phase angle between the signal from said oscillator and one of said carrier signals at one of said detectors differs from the phase angle between the signal from said oscillator and said same carrier at the other of said detectors by the difference in phase between said differently phased carrier signals, means for maintaining a predetermined phase relationship between the output signal of said reference oscillator and one of said multiplex carrier signals supplied to said two synchronous detectors, said last-mentioned means comprising signal combining means having first and second inputs, means providing a direct current connection between said first and second inputs of said signal combining means and the outputs of said first and second synchronous detectors, respectively, said signal combining means providing an output signal having an amplitude and polarity which is indicative of the relative magnitudes of the signals supplied to said first and second inputs thereof, signal responsive phase-frequency control means connected to the output of said combining means, said phase-frequency control means being connected to said reference oscillator thereby to control the phase and frequency of the signal generated thereby.

8. A radio receiver system for separating information signals multiplexed on two differently phased carrier signals of the same frequency into separate information channels, said receiver system including a heterodyne mixer circuit, a local oscillation generator associated with said heterodyne mixer circuit, means for supplying said multiplex signal to said heterodyne mixer circuit, first and second synchronous detectors, coupling means for supplying the output signal of said heterodyne mixer to one input of each of said synchronous detectors, a reference signal generator, coupling means for supplying the output signal of said reference signal generator to said first and second synchronous detectors, at least one of said two last-mentioned coupling means including phase shift means, the phase shift provided by said phase shift means being such that the phase angle between the signal from said oscillator and one of said carrier signals at one of said detectors differs from the phase angle between the signal from said oscillator and said same carrier frequency signal at the other of said detectors by the difference in phase between said differently phased carrier signals, and means for maintaining a predetermined phase relationship between the output signal of said reference oscillator and one of the multiplex carrier signals supplied at the input of said two synchronous detectors, said last-mentioned means comprising signal combining means having first and second inputs, means providing a direct current connection between said first and second inputs of said signal combining means and the outputs of said first and second synchronous detectors, respectively, said signal combining means providing an output signal having an amplitude and polarity which is indicative of the relative magnitudes of the signals supplied to said first and second inputs thereof, signal responsive phase-frequency control means connected to the output of said combining means, said phase-frequency control means being connected to one of said generators thereby to control the phase and frequency of the signal generated thereby.

9. A radio receiver system for separating information signals multiplexed on two differently phased carrier signals of the same frequency into separate information channels, said receiver system including first and second synchronous detectors, coupling means for supplying said multiplex signal to one input of each of said synchronous detectors, a reference signal oscillator, coupling means for supplying the output signal of said oscillator to said first and second synchronous detectors, at least one of said two last-mentioned coupling means including phase shift means, the phase shift provided by said phase shift means being such that the phase angle at one of said detectors between the signal from said oscillator and one of said carrier signals differs from the phase angle at the other of said detectors between the signal from said oscillator and said same carrier signal by the difference in phase between said differently phased carrier signals, means for maintaining a predetermined phase relationship between the output signal of said reference oscillator and one of the multiplex carrier signals supplied to said two synchronous detectors, said last-mentioned means comprising first and second low pass filters connected to the outputs of said first and second synchronous detectors, respectively, signal combining means connected to the outputs of said low pass filters, said signal combining means providing an output signal having an amplitude and polarity which is indicative of the relative magnitudes of the signals passed by said low pass filters, signal responsive variable reactance means connected to the output of said combining means, said variable reactance means being connected in circuit with said reference oscillator thereby to control the phase and frequency of the signal generated thereby.

10. A radio receiver system for separating information signals multiplex on two differently phased carrier signals of the same frequency into separate information channels, said receiver system including first and second synchronous detectors, coupling means for supplying said multiplex signal to one input of each of said synchronous detectors, a reference signal oscillator, coupling means for supplying the output signal of said oscillator to said first and second synchronous detectors, at least one of said two last-mentioned coupling means including phase shift means, the phase shift provided by said phase shift means being such that the phase angle between the signal from said oscillator and one of said carrier signals at one of said detectors differs from the phase angle between the signal from said oscillator and said same carrier signal at the other of said detectors by the difference in phase between said differently phased carrier signals, means for maintaining a predetermined phase relationship between the output signal of said reference oscillator and one of the multiplex carrier signals supplied to said two synchronous detectors, said last-mentioned means comprising first and second low pass filters connected to the outputs of said first and second synchronous detectors, respectively, signal combining means connected to the outputs of said low pass filters, said signal combining means providing an output signal having an amplitude and polarity which is indicative of the relative magnitudes of the signals passed by said low pass filters, signal responsive phase-frequency control means connected to the output of said combining means, said phase-frequency control means being connected to said reference oscillator to control the phase and frequency of the signal generated thereby.

11. A radio receiver system for separating information signals multiplexed on two differently phased carrier signals of the same frequency into separate information channels, said receiver system including a heterodyne mixer circuit, a local oscillation generator associated with said heterodyne mixer circuit, means for supplying said multiplex signal to said heterodyne mixer circuit, first and second synchronous detectors, coupling means for supplying the output signal of said heterodyne mixer to one input of each of said synchronous detectors, a reference signal generator, coupling means for supplying the output signal of said reference signal generator to said first and second synchronous detectors, at least one of said two last-mentioned coupling means including phase shift means, the phase shift provided by said phase shift means being such that the phase angle between the signal from said oscillator and one of said carrier signals at one of said detectors differs from the phase angle between the signal from said oscillator and said same carrier signal at the other of said detectors by the difference in phase between said differently phased carrier signals, and means for maintaining a predetermined phase relationship between the output signal of said reference oscillator and one of the multiplex carrier signals supplied to the input of said two synchronous detectors, said last-mentioned means comprising first and second low pass filters connected to the outputs of said first and second synchronous detectors, respectively, signal combining means connected to the outputs of said low pass filters, said signal combining means providing an output signal having an amplitude and polarity which is indicative of the relative magnitudes of the signals passed by said low pass filters, signal responsive variable reactance means connected to the output of said combining means, said variable reactance means being connected in circuit with one of said generators thereby to control the phase and frequency of the signal generated thereby.

12. A radio receiver system for separating information signals multiplexed on two differently phased carrier signals of the same frequency into separate information channels, said receiver system including a heterodyne mixer circuit, a local oscillation generator associated with said heterodyne mixer circuit, means for supplying said multiplex signal to said heterodyne mixer circuit, first and second synchronous detectors, coupling means for supplying the output signal of said heterodyne mixer to one input of each of said synchronous detectors, a reference signal generator, coupling means for supplying the output signal of said reference signal generator to said first and second synchronous detectors, at least one of said two last-mentioned coupling means including phase shift means, the phase shift provided by said phase shift means being such that the phase angle at one of said detectors between the signal from said oscillator and one of said carrier signals differs from the phase angle at the other of said detectors between the signal from said oscillator and said same carrier signal by the difference in phase between said differently phased carrier signals, and means for maintaining a predetermined phase relationship between the output signal of said reference oscillator and one of the multiplex carrier signals supplied at the input of said two synchronous detectors, said last-mentioned means comprising first and second low pass filters connected to the outputs of said first and second synchronous detectors, respectively, signal combining means connected to the outputs of said low pass filters, said signal combining means providing an output signal having an amplitude and polarity which is indicative of the relative magnitudes of the signals passed by said low pass filters, signal responsive phase frequency control means connected to the output of said combining means, said phase-frequency control means being connected to one of said generators thereby to control the phase and frequency of the signal generated thereby.

References Cited in the file of this patent

UNITED STATES PATENTS

| | | |
|---|---|---|
| 1,666,158 | Affel | Apr. 17, 1928 |
| 2,467,361 | Blewett | Apr. 12, 1949 |
| 2,812,431 | Adler | Nov. 5, 1957 |
| 2,916,545 | Baugh | Dec. 8, 1959 |